United States Patent
Ting et al.

(10) Patent No.: US 10,787,547 B2
(45) Date of Patent: Sep. 29, 2020

(54) THERMOPLASTIC ELASTOMER COMPOSITION FOR CROSSLINKED FOAM AND USE THEREOF

(71) Applicant: TSRC Corporation, Kaohsiung (TW)

(72) Inventors: Ching Ting, Kaohsiung (TW);
Wen-Hsien Wen, Kaohsiung (TW);
Feng-Yu Yang, Kaohsiung (TW);
Hsuan-Tsung Lin, Kaohsiung (TW);
Ying-Pin Tu, Kaohsiung (TW)

(73) Assignee: TSRC Corporation, Dashe Dist., Kaohsiung (TW)

( * ) Notice: Subject to any disclaimer, the term of this patent is extended or adjusted under 35 U.S.C. 154(b) by 267 days.

(21) Appl. No.: 15/878,630

(22) Filed: Jan. 24, 2018

(65) Prior Publication Data

US 2018/0208723 A1 Jul. 26, 2018

Related U.S. Application Data

(60) Provisional application No. 62/450,435, filed on Jan. 25, 2017.

(51) Int. Cl.
| | | |
|---|---|---|
| *C08J 3/24* | (2006.01) | |
| *C08J 9/10* | (2006.01) | |
| *C08L 23/30* | (2006.01) | |
| *C08L 23/16* | (2006.01) | |
| *C08J 9/00* | (2006.01) | |

(52) U.S. Cl.
CPC .............. *C08J 3/24* (2013.01); *C08J 9/0061* (2013.01); *C08J 9/103* (2013.01); *C08L 23/16* (2013.01); *C08L 23/30* (2013.01); *C08J 2201/026* (2013.01); *C08J 2203/04* (2013.01); *C08J 2205/06* (2013.01); *C08J 2205/10* (2013.01); *C08J 2207/00* (2013.01); *C08J 2323/08* (2013.01); *C08J 2323/16* (2013.01); *C08J 2409/06* (2013.01); *C08J 2453/02* (2013.01); *C08L 2203/14* (2013.01); *C08L 2205/025* (2013.01); *C08L 2205/03* (2013.01); *C08L 2312/02* (2013.01)

(58) Field of Classification Search
CPC ...................................................... C08J 9/0061
See application file for complete search history.

(56) References Cited

U.S. PATENT DOCUMENTS

| | | | |
|---|---|---|---|
| 7,612,148 B2 * | 11/2009 | Tsai ...................... | B01J 31/0259 525/331.7 |
| 9,493,623 B2 | 11/2016 | Shimizu et al. | |
| 10,323,164 B2 * | 6/2019 | Nakatani .................. | C09J 11/06 |
| 2006/0154998 A1 | 7/2006 | Shiba et al. | |
| 2010/0190912 A1 * | 7/2010 | Muyldermans ..... | C08F 297/044 524/505 |
| 2011/0275731 A1 * | 11/2011 | Shimizu ................. | C08J 9/0061 521/139 |
| 2015/0257473 A1 * | 9/2015 | Liu ........................ | B29D 35/04 36/87 |
| 2016/0230000 A1 * | 8/2016 | Gu .......................... | B32B 25/08 |
| 2016/0257798 A1 * | 9/2016 | Park .................... | C08G 18/7831 |
| 2017/0101499 A1 * | 4/2017 | Nakatani ............. | C08F 297/044 |

FOREIGN PATENT DOCUMENTS

| | | |
|---|---|---|
| CN | 102257047 | 11/2011 |
| CN | 104910507 | 9/2015 |
| EP | 1795552 | 6/2007 |
| JP | 2004-331707 | 11/2004 |
| JP | 2012-36299 | 2/2012 |
| JP | 2015-10205 | 1/2015 |

OTHER PUBLICATIONS

Machine Translation of JP 2004331707 (Year: 2020).*
Handlin et al. Soft, processable SEBS polymers for compounds. TSRC-Dexco Polymers. Rubber World. (Year: 2016).*
Polymer Properties Database. SBR—Styrene Butadiene Rubber. Evidentiary Reference. (Year: 2015).*
Omnexus 1. Styrene-Butadiene Rubber: Complete Technical Guide on SBR & its Features. Evidentiary Reference. (Year: 2020).*
Omnexus 2. Plastics & Elastomers. Universal Selector by SpecialChem. Evidentiary Reference. (Year: 2020).*
TIPO; International Search Report issued by Taiwan Patent Office dated Sep. 18, 2018 in TW Application No. 10720854690.
EPO; International Extended Search Report dated May 7, 2018 in EP Application No. 18000044.0.

* cited by examiner

*Primary Examiner* — Michael M Dollinger
(74) *Attorney, Agent, or Firm* — Snell & Wilmer L.L.P.

(57) ABSTRACT

A thermoplastic elastomer composition for crosslinked foam and the manufacturing method thereof are provided. The thermoplastic elastomer composition comprising (A) an ethylene-based copolymer; (B) a first copolymer; (C) a second copolymer, wherein the component (B) and (C) are copolymers comprising a vinyl aromatic monomer and a conjugated diene monomer, the first copolymer having a conjugated diene hydrogenation rate of at least 80% and the second copolymer having a conjugated diene hydrogenation rate of no more than 10%; (D) an organic peroxide; and (E) a foaming agent, wherein a mass ratio (A/(B+C)) of the component (A) to a combination of the component (B) and the component (C) is 95/5 to 5/95; and a mass ratio (B/C) of the component (B) to the component (C) is 9/1 to 1/9. A crosslinked foam made from the composition and the manufacturing method thereof are also provided.

16 Claims, No Drawings ic elastomer composition for a crosslinked
THERMOPLASTIC ELASTOMER COMPOSITION FOR CROSSLINKED FOAM AND USE THEREOF

CROSS-REFERENCE TO RELATED APPLICATION

This application claims the right of priority based on U.S. Provisional Application No. 62/450,435, entitled "CROSS-LINKABLE THERMOPLASTIC ELASTOMER COMPOSITION FOR FOAM AND USE THEREOF," and filed on Jan. 25, 2017, which is incorporated herein by reference to the extend it does not conflict with the present disclosure.

BACKGROUND OF THE INVENTION

Field of the Invention

The present invention relates to a thermoplastfoam obtained by blending at least two kinds of vinyl aromatic-conjugated diene copolymers, and to its application.

Description of the Prior Art

Because crosslinked foams have light weight, high flexibility, and high mechanical strength, they can be applied in many fields, such as interior and exterior materials for construction, automobile parts, packaging materials, and daily commodities. As they meet the requirements of light weight, high mechanical strength, and impact resistance, the foams can be used for a long term, without deflections, and can withstand harsh use conditions.

Ethylene/vinyl acetate copolymer (EVA) is a typical material used as a crosslinked foam. However, because EVA crosslinked foam has low tension when it melts, it is easily defoamed. Expansion ratio has been reduced to prevent this phenomenon, but that leads to high specific gravity, high compression set, and deformation. In addition, EVA has the problem of an obviously roughened surface caused by defoaming.

There are also crosslinked foams using ethylene-α-olefin copolymers. U.S. Pat. No. 5,407,965A discloses a crosslinked foam using an ethylene-α-olefin copolymer. Japanese Patent No. JPH11206406A also discloses a crosslinked foam obtained by using a mixture of EVA and an ethylene-α-olefin-based copolymer.

There are also studies regarding adding a styrene-based block copolymer to improve the physical properties of a crosslinked foam. Japan Patent Publication No. 2004107519A discloses a crosslinked foam obtained by adding a styrene-based block copolymer to an ethylene-based copolymer. U.S. Patent Publication No. 2006/0154998A1 also discloses a resin composition containing an ethylene-α-olefin-based copolymer and styrene-butadiene-styrene (SBS) or styrene-ethylene-butylene-styrene (SEBS). Although these prior art references disclose the addition of the styrenic block copolymer to the ethylene-based copolymer, the obtained crosslinked foams do not have good balance in physical properties on various aspects, such as tear strength, split tear strength, compression set, and rebound resilience.

Furthermore, thermoplastic elastomer compositions containing hydrogenated and non-hydrogenated styrenic block copolymers have been reported. U.S. Pat. No. 6,861,472B2 discloses a thermoplastic elastomer composition containing polyarylene ether, homopolymer of an alkenyl aromatic monomer, a polyolefin, a hydrogenated styrene block copolymer, and an unhydrogenated styrene block copolymer. Although this composition provides high rigidity and high impact strength, it is not suitable for use in crosslinked foams.

Therefore, it is necessary to develop a novel polymer composition having excellent characteristics to solve the above-mentioned problems.

SUMMARY OF THE INVENTION

The present invention provides a composition for crosslinked foam, comprising at least two kinds of vinyl aromatic-conjugated diene copolymers of which one is a highly hydrogenated vinyl aromatic-conjugated diene copolymer, and the other is a less hydrogenated or non-hydrogenated vinyl aromatic-conjugated diene copolymer. The composition for crosslinked foam described above produces various crosslinked elastomers having a good balance in various physical properties.

The present invention is characterized by comprising at least two kinds of vinyl aromatic-conjugated diene copolymers, as described above, to formulate the desired content of unsaturated double bond, and thereby, to produce a composition suitable for crosslinked foams. Compared with compositions for crosslinked foam using only one partially hydrogenated vinyl aromatic-conjugated diene copolymer, the composition of the present invention is formulated with at least two kinds of copolymers, and the process is easier and more flexible.

Particularly, in terms of the crosslinked foam using only a single partially hydrogenated vinyl aromatic-conjugated diene copolymer, the content of unsaturated double bonds of the composition thereof is dependent only upon the single partially hydrogenated vinyl aromatic-conjugated diene copolymer. Since the single partially hydrogenated vinyl aromatic-conjugated diene copolymer having the specific requirements of the unsaturated double bond content is tailored by a very accurate process control, it is difficult to obtain in the market. It is also quite costly to prepare, whether by the manufacture or by ordering, such a single partially hydrogenated vinyl aromatic-conjugated diene copolymer.

In order to effectively solve the above-mentioned problems, the present invention uses at least two kinds of vinyl aromatic-conjugated diene copolymers to formulate the desired content of unsaturated double bonds. One advantage of the present invention is that there are many selections of vinyl aromatic-conjugated diene copolymers. For example, fully or nearly fully saturated SEBS/SEPS/SEEPS and unsaturated or nearly unsaturated SBS/SIS/SIBS are all candidates for the formulations of the composition of the present invention. The degree of unsaturation that achieves the requirements can be created with different proportions of at least two kinds of vinyl aromatic-conjugated diene copolymers, and thereby optimizing the performance of each formulated composition.

DETAILED DESCRIPTION OF THE EMBODIMENTS

The preferred embodiments of the present invention will now be described in greater details as below. Descriptions of well-known components, materials, and process techniques are omitted so as to not unnecessarily obscure the embodiments of the invention.

A Thermoplastic Elastomer Composition for Crosslinked Foam

The thermoplastic elastomer composition for crosslinked foam of the present invention mainly comprises: (A) an ethylene-based copolymer; (B) a first copolymer; (C) a second copolymer, wherein the component (B) and (C) are copolymers comprising a vinyl aromatic monomer and a conjugated diene monomer, the first copolymer having a conjugated diene hydrogenation rate of at least 80% and the second copolymer having a conjugated diene hydrogenation rate of no more than 10%; (D) an organic peroxide; and (E) a foaming agent, wherein a mass ratio (A/(B+C)) of the component (A) to a combination of the component (B) and the component (C) is 95/5 to 5/95, and a mass ratio (B/C) of the component (B) to the component (C) is 9/1 to 1/9, preferably 9/1 to 5/5, more preferably 9/1 to 7/3. In the preferred embodiments of the present invention, the component (B) and the component (C) of the thermoplastic elastomer compositions used for the crosslinked foam having a good balance in physical properties on various aspects have a sum of "a content of conjugated diene unsaturated double bonds" ranging between 12% to 50%. The formula for calculation of "a content of conjugated diene unsaturated double bonds" is:

Content of conjugated diene unsaturated double bonds (%)=(mass fraction of component($B$))/(mass fraction of component($B$)+mass fraction of component($C$))×(100%−conjugated diene hydrogenation rate of component($B$))+(mass fraction of component($C$))/(mass fraction of component($B$)+mass fraction of component($C$))×(100%−conjugated diene hydrogenation rate of component($C$)).

The thermoplastic elastomer composition for crosslinked foam is a kneading product obtained by blending the above ingredients together. The various components of the composition of the present invention are described in detail below.

(A) Ethylene-Based Copolymer

The ethylene-based copolymer of the present invention is any homopolymer or copolymer containing ethylene as a monomer, such as polyethylene, ethylene/vinyl acetate copolymer (EVA), ethylene-α-olefin copolymer (block or random). Taking polyethylene (PE) as an example, the ethylene-based copolymer is preferably high-density polyethylene (HDPE), ultra-high molecular weight high density polyethylene, low density polyethylene(LDPE), linear low density polyethylene(LLDPE), and ultra-low density polyethylene(ULDPE), etc. It is also possible to use a mixture of a polyethylene-based resin and a polypropylene-based resin. A copolymer containing ethylene and two monomers other than ethylene may be used. Examples thereof may include copolymers containing ethylene, α-olefins, and unsaturated carboxylic acids (acrylic acid, methacrylic acid, maleic acid, and the like). In the present embodiment, ethylene-α-olefin-based copolymers are preferred; ethylene-α-olefin-based copolymers containing ethylene and C3-C10 α-olefins are more preferred; ethylene-α-olefin-based copolymers containing ethylene and C3-C6 α-olefins are still more preferred; and ethylene-α-olefin-based copolymers containing ethylene and propylene or 1-butene are even more preferred.

(B) The First Copolymer and (C) the Second Copolymer

The first copolymer (component (B)) of the present invention comprises a vinyl aromatic monomer and a conjugated diene monomer, wherein the conjugated diene has a hydrogenation rate of at least 80%, preferably at least 90%, more preferably at least 95%. The second copolymer (component (C)) of the present invention comprises a vinyl aromatic monomer and a conjugated diene monomer, wherein the conjugated diene has a hydrogenation rate of no more than 10%, preferably no more than 5%, more preferably 0% (non-hydrogenated).

In a preferred embodiment, the first copolymer has a peak molecular weight (Mp) of 50,000 to 300,000; the second copolymer has a peak molecular weight (Mp) of 50,000 to 300,000. In a preferred embodiment, the first copolymer has a vinyl aromatic monomer content of 10% to 50%, and the second copolymer has a vinyl aromatic monomer content of 10% to 50%. In a preferred embodiment, the first copolymer has a 1,2-vinyl bond content of 30% to 80%; the second copolymer has a 1,2-vinyl bond content of 5% to 80%. In a preferred embodiment, the tan δ peak temperature of the first copolymer determined by dynamic viscoelasticity measurement (measurement frequency: 1 Hz) is in the range of −65° C. to −35° C., or more preferably −50° C. to −35° C.; the tan δ peak temperature of the second copolymer determined by dynamic viscoelasticity measurement (measurement frequency: 1 Hz) is in the range of −80° C. to −40° C., or more preferably in the range of −80° C. to −60° C.

The first copolymer and the second copolymer are copolymers each comprising a vinyl aromatic monomer and a conjugated diene monomer. In detail, each of the first copolymer and the second copolymer may be a block, a random, or a taper arrangement of the two monomers mentioned above or other suitable polymeric monomers. Among them, the block copolymer is preferable, and the triblock copolymer is more preferable. The conjugated diene monomer suitable for the present invention may be a conjugated diene having 4 to 12 carbon atoms. Specific examples include 1,3-butadiene, isoprene, 2,3-dimethyl-1, 3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, and mixtures thereof. Among them, 1,3-butadiene and isoprene are the preferred options. Specific examples of vinyl aromatic monomers suitable for using in the present invention include styrene, 4-tert-butylstyrene, α-methyl styrene, o-methyl styrene, p-methyl styrene, divinyl benzene, 1,1-diphenyl ethylene, vinyl naphthalene, N, N-dimethyl-p-aminoethylstyrene, N, N-diethyl-p-aminoethylstyrene, and mixtures thereof. A preferred example is styrene. Preferred examples of copolymers comprising the vinyl aromatic monomer and the conjugated diene monomer are as follows: the first copolymer prior to hydrogenation are styrene-butadiene-styrene triblock copolymer, styrene-isoprene-styrene triblock copolymer and styrene-isoprene/butadiene-styrene copolymer; and the second copolymer are styrene-butadiene-styrene triblock copolymer, styrene-isoprene-styrene triblock copolymer and styrene-isoprene/butadiene-styrene copolymer.

The method for producing the first copolymer (component (B)) and the second copolymer (component (C)) of the present invention comprises polymerization and/or hydrogenation. Various known methods may be used for the polymerization and/or hydrogenation, for example, referring to the U.S. Pat. No. 7,612,148B2. In addition, a suitable one may be selected from commercially available hydrogenated or non-hydrogenated vinyl aromatic-conjugated diene thermoplastic elastomers as the first copolymer (component (B)) and the second copolymer (component (C)). Commercially available hydrogenated vinyl aromatic-conjugated diene copolymers, such as styrene-ethylene-butylene-styrene (SEBS) thermoplastic elastomer of Kraton G series by Kraton Corporation, Septon 8 series by Kuraray Corporation, SEBS series by TSRC Corporation, SEBS 2 series by Polymeri Corporation, Calprene H series by Dynasol Corporation, and Tuftec H series by Asahi Corporation, can be used as a material of a hydrogenated vinyl aromatic-conjugated diene block copolymer having styrene as the vinyl aromatic monomer and 1,3-butadiene as the conjugated diene monomer. An example is the hydrogenated styrene-butadiene rubber (HSBR) thermoplastic elastomers, such as Dynaron series or the special TPE complex products of Dynaron series by JSR Corporation, can be used as a material of a hydrogenated vinyl aromatic-conjugated diene partially block or random copolymer having styrene as the vinyl aromatic monomer and 1,3-butadiene as the conjugated diene monomer. Also, for example, styrene-ethylene-propylene-styrene (SEPS) thermoplastic elastomers of Septon 2 series by Kuraray Co., Ltd. can be used as a material of a hydrogenated vinyl aromatic-conjugated diene block copolymer having styrene as the vinyl aromatic monomer and isoprene as the conjugated diene monomer. Also, for example, styrene-[ethylene-(ethylene-propylene)]-styrene (SEEPS) thermoplastic elastomers of Septon 4 series by Kuraray Co., Ltd. can be used as a material of a hydrogenated vinyl aromatic-conjugated diene block copolymer having styrene as the vinyl aromatic monomer and a mixture of isoprene and 1,3 butadiene as the conjugated diene monomer. Examples of commercially available non-hydrogenated vinyl aromatic-conjugated diene copolymers are such as SBS series and SIS series by TSRC Corporation, Kraton D series by Kraton Corporation, Hybrar series by Kuraray Co., Ltd., Calprene C series by Dynasol Corporation, and TR/SIS series by JSR Corporation.

(D) Organic Peroxide

The component (D) of the present invention is any organic peroxide having a cross-linking effect. Specific examples include dicumyl peroxide, di-tert-butylperoxide, 2,5-dimethyl-2,5-di(tert-butylperoxy)hexane, 2,5-di(tert-butylperoxy)-2,5-dimethyl-3-hexyne, di(tertbutylperoxyisopropyl)benzene, 1,1-di-(tert-butylperoxy)-3,3,5-trimethylcyclohexane, butyl 4,4-di(butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxy isopropyl carbonate, diacetyl peroxide, lauroyl peroxide, tert-butyl cumyl peroxide, etc. One or two or more of these peroxides may be used in combination. The content of the component (D) in the composition of the present invention is preferably 0.01 to 10 parts by mass, more preferably 0.05 to 7 parts by mass with respect to a total of 100 parts by mass of the components (A), (B) and (C).

(E) Foaming Agent

The component (E) of the present invention is not particularly limited, and any known foaming agent can be used. Specific examples of organic thermal decomposable foaming agents include azodicarbonamide (ADCA), N,N'-dinitrosopentamethylenetetramine, 4,4'-oxybis(benzenesulfonylhydrazide), diphenylsulfone-3,3'-disulfonyl hydrazide (DPSDSH), p-toluenesulfonyl semicarbazide, or trihydrazinotriazine; specific examples of inorganic thermal decomposable foaming agents are sodium hydrogencarbonate, sodium carbonate, ammonium hydrogencarbonate, and ammonium carbonate. Among the foaming agents mentioned above, azodicarbonamide (ADCA) and sodium hydrogencarbonate are preferred. The content of the component (E) in the composition of the present invention is preferably from 0.5 to 20 parts by mass, more preferably from 1 to 12 parts by mass with respect to a total of 100 parts by mass of the components (A), (B) and (C).

Other Additives

In addition to the above-mentioned components, the thermoplastic elastomer composition for crosslinked foam of the present invention may contain, if necessary, an organometallic compound, a crosslinking coagent, a filler, a thermal stabilizer, a weathering stabilizer, a flame retardant, a hydrochloric acid absorber, pigments, etc. The addition of the organometallic compound increases the gel fraction of the resulting crosslinked foam and makes the foamed pores finer and more uniform. The organometallic compound containing a metal selected from the metals in the Groups 2 to 12 of the periodic table. For example, zinc diacrylate (ZDA), zinc dimethacrylate (ZDMA), etc. The addition of crosslinking coagents accelerates the rate of crosslinking reaction. Examples of crosslinking coagents are sulfur, p-quinonedioxime, p,p'-dibenzoyl quinonedioxime, N-methyl-N-4-dinitrosoaniline, nitrosobenzene, diphenylguanidine, trimethylolpropane-N, N'-m-phenylenedimaleimide, divinyl benzene, triallyl cyanurate (TAC), triallyl isocyanurate (TAIC), ethylene glycol dimethacrylate, diethylene glycol dimethacrylate, polyethylene glycol dimethacrylate, trimethylol propane trimethacrylate, allyl methacrylate, vinyl butyrate, and vinyl stearate. Examples of fillers are clay, titanium dioxide, silicon dioxide, zinc oxide, talc, calcium carbonate, etc. Examples of thermal stabilizers include phosphorus-based thermal stabilizers such as Irgafos 168, lactone-based thermal stabilizers such as HP-136, and sulfur-based thermal stabilizers. Examples of the weathering stabilizer include hindered phenol-based weathering stabilizer, phosphite-based weathering stabilizer, thioether-based weathering stabilizer, etc. Examples of the flame retardant include red phosphorus-based flame retardants, halogen-based flame retardants, organophosphoate-based, and inorganic flame retardants, etc. Examples of hydrochloric acid absorbers include calcium stearate, etc. Examples of the pigment include azo-based pigments, phthalocyanine-based pigments, oxide-based pigments such as titanium oxide, chromate-based pigments, molybdate-based pigments, inorganic pigments such as selenium sulfide compounds, ferricyanide compounds, and carbon black, etc.

Preparation of a Thermoplastic Elastomer Composition for Crosslinked Foam

Each of the above-mentioned ingredients may be hot-melt and mixed in a suitable kneader to obtain the thermoplastic elastomer composition of the present invention. The hot-melting and mixing process must be carried out at a temperature range at which the organic peroxide (component (D)) and the foaming agent (component (E)) do not decompose, with a preferred temperature range being about 100° C. to 140° C. The order of adding each component during mixing is not particularly limited. For example, component (A), component (B), and component (C) may be mixed in advance, and then component (D) and component (E) may be further added. The shape of the thermoplastic elastomer composition for crosslinked foam is not particularly limited, and may be granular, sheet/film, strand, crumb, etc. The preferred embodiment of the present invention is that after kneading, it is pelletized with a pelletizer to prepare thermoplastic elastomer composition pellets in an uncrosslinked and unfoamed state.

Preparation of Crosslinked Foam

The above-mentioned thermoplastic elastomer composition for crosslinked foam is crosslinked and foamed to prepare a crosslinked foam. For example, the unfoamed thermoplastic elastomer composition pellets (in any other suitable shape) may be processed in a mold in a range of 100° C. to 200° C. for 3 to 20 minutes for melting and injection. After the crosslinking reaction and decomposition of the foaming agent, the mold is opened to foam the composition to complete the primary crosslinked foam. The primary crosslinked foam is further processed to form a secondary crosslinked foam by mold compression in a way to reach the specific gravity of 0.2~0.3. The condition of mold compression does not particularly limit, preferably with a mold temperature of 100° C. to 200° C., a compression time of 5 minutes to 60 minutes, compression ratio of 1.1 to 3.0.

The crosslinked foam produced in the preferred embodiment of the present invention has the following advantages and has a good balance in physical properties on various aspects. In particular, the preferred crosslinked foams have a hardness of 45 C to 60 C, a specific gravity of 0.2-0.3, and a split tear strength of at least 3.3 kg/cm; in addition to the advantages mentioned above, more preferred crosslinked foams have an expansion ratio of 1.4 to 1.6, a rebound resilience of 55% to 70%, and a compression set of no greater than 55%; and even more preferably crosslinked foams further have a tensile strength at break of 30 kg/cm$^2$ to 60 kg/cm$^2$, an elongation at break of at least 450%, and a tear strength of at least 10 kg/cm. The crosslinked foam of the present invention is lightweight and flexible, has excellent properties on a split tear strength, compression set, tear strength, rebound resilience, etc., and can be widely used in automobile related products, construction related products, various types of packaging materials, and daily commodities.

The following Examples describe the methods, features, and advantages of the present invention in detail. However, it is not intended to limit the scope of the present invention. The scope of the present invention should be determined by the appended claims and their equivalents.

Example 1

TAFMER DF810 (polyolefin elastomer, POE) by Mitsui Chemicals was used as the component (A); Taipol DP-6014 by TSRC Corporation was used as the component (B), which has a conjugated diene hydrogenation rate of 99%; Taipol 3206 by TSRC Corporation was used as the component (C), which has a conjugated diene hydrogenation rate of 0%; dicumyl peroxide was used as the component (D); azodicarbonamide was used as the component (E). Eighty (80) parts by mass of the component (A), 17 parts by mass of the component (B), 3 parts by mass of the component (C), 0.6 parts by mass of the component (D), and 1.9 parts by mass of the component (E) were melted and kneaded at 120° C. and then crosslinked and foamed under the condition of 170° C. to 174° C. of injection molding to obtain the primary crosslinked foam. The primary crosslinked foam was further processed to form a secondary crosslinked foam by mold compression in a way to reach the specific gravity of 0.23. Physical properties of the secondary crosslinked foam were measured. The content of conjugated diene unsaturated double bonds (%) of the composition of Example 1=(17)/(17+3)×(100%-99%)+(3)/(17+3)×(100%-0%)=15.85%.

The detailed procedures of Examples 2 to 4 and Comparative Examples 1-4 are similar to that of Example 1, except that the conditions of the experiments are different. See Table I: Specifications for the First Polymer and the Second Polymer; Table II: Experimental conditions and results of Examples 1 to 4; Table III: Experimental conditions and results of Comparative Examples 1 to 4. Data marked as "*" in the tables are data with bad physical properties. Examples 1 to 4 are examples of the compositions suitable for crosslinked foam and the crosslinked foams thereof produced with different contents of conjugated diene unsaturated double bond formulated with two types of vinyl aromatic-conjugated diene copolymers according to the present invention. Comparative Examples 1 to 4 are examples of the compositions for crosslinked foam and the crosslinked foams thereof produced with one single type of vinyl aromatic-conjugated diene copolymer (fully saturated or unsaturated).

Comparing Table II with Table III, it shows that some physical properties of Comparative Examples 1 to 4 did not achieve the requirements, and crosslinked elastomers with a good balance in physical properties on various aspects were not obtained. In particular, the crosslinked foams of Examples 1 to 4 obtained from the compositions made by formulating the first copolymer and the second copolymer had better split tear strength than the crosslinked foams of Comparative Examples 1 to 4 made with fully saturated components (B) (Comparative Examples 1 to 2) or with the unsaturated component (C) (Comparative Examples 3 to 4).

Method of Measuring Various Properties of the Present Invention

Peak Molecular Weight (Mp): Measurement by gel permeation chromatography, which is a well-known measurement method by those skilled in the art.

The hydrogenation rate, the vinyl aromatic monomer content (for example, the styrene content, %) and the 1,2-vinyl bond content (vinyl, %) are all measured using a nuclear magnetic resonance analyzer. These methods are all well-known measurement methods by those skilled in the art.

Melt flow index (MFI): Measured based on ASTM D1238 standard.

Tensile strength at break (Tb, kg/cm$^2$): Measured based on ASTM D412 standard.

Elongation at break (Eb, %): Measured based on ASTM D412 standard.

Specific gravity: A test piece of the secondary crosslinked foam with a suitable size was measured with an electronic hydrometer.

Hardness: A test piece of the secondary crosslinked foam with a suitable size was measured with an ASKER durometer.

Compression set: A test piece of the secondary crosslinked foam with a suitable size was compressed to 50% of the thickness and held at 50° C. for 6 hours and then released to measure the thickness after 30 minutes.

Tear Strength: Measured based on ASTM D624 standard.

Rebound resilience: The rebound resilience of the secondary crosslinked foam was measured based on the ASTM D2632 standard.

Split tear strength: According to ASTM D3574-95, a test piece of the secondary crosslinked foam with a size of 2.54 cm×15.24 cm×1 cm (thickness) was cut at the middle of the test piece and held at a distance of about 3 cm between the clamps, and the split tear strength of the test piece was measured for 5 points in each 2 cm interval with a universal tensile compression testing machine.

Expansion ratio: Expansion ratio is the size ratio of the foamed test piece to the original mold.

TABLE I

| Item | | Polymerized monomer | Structural characteristics (before hydrogenation) | Conjugated diene hydrogenation rate (%) | Vinyl aromatic hydrogenation rate (%) | Styrene content (%) | 1,2 vinyl bond content (%) | Tan δ | Triblock peak molecular weight (Mp) | MFR (g/10 min) @ 230° C./ 2.16 kg | MFR (g/10 min) @ 200° C./ 5 kg | MFR (g/10 min) @ 190° C./ 2.16 kg |
|---|---|---|---|---|---|---|---|---|---|---|---|---|
| Component (B) | Taipol DP-6014 | 1,3-Butadiene, Styrene | SBS triblock | 99 | <5 | 18.5 | 38 | −42 | 95,000 | 7 | — | — |
| | Taipol 6150 | 1,3-Butadiene, Styrene | SBS triblock | 99 | <5 | 30 | 38 | −40 | 98,000 | <1 | — | — |
| | Taipol DP-6245 | 1,3-Butadiene, Styrene | SBS triblock | 99 | <5 | 12.6 | 77.1 | −20 | 86,000 | 3.2 | — | — |
| Component (C) | Taipol 3206 | 1,3-Butadiene, Styrene | SBS triblock | 0 | 0 | 29 | 10 | −72 | 125,000 | — | — | 6 |
| | Taipol DP-6014 Base | 1,3-Butadiene, Styrene | SBS triblock | 0 | 0 | 18.5 | 38 | −70 | 95,000 | — | — | ~100 |
| | Vector SIS 4111 | Isoprene, Styrene | SIS triblock | 0 | 0 | 18.25 | 10 | −40 | 172,000 | — | 11 | — |

TABLE II

| | Example 1 | | Example 2 | | Example 3 | | Example 4 | |
|---|---|---|---|---|---|---|---|---|
| Component (A)/ mass fraction | DF810 | 80 | TAFMER DF810 | 80 | TAFMER DF810 | 80 | TAFMER DF810 | 80 |
| Component (B)/ mass fraction | Taipol DP-6014 | 17 | Taipol DP-6014 | 14 | Taipol DP-6014 | 17 | Taipol 6150 | 17 |
| Component (C)/ fraction | Taipol 3206 | 3 | Taipol 3206 | 6 | Taipol DP-6014 Base | 3 | Taipol 3206 | 3 |
| Component (D)/ mass fraction | dicumyl peroxide | 0.6 | dicumyl peroxide | 0.6 | dicumyl peroxide | 0.6 | dicumyl peroxide | 0.6 |
| Component (E)/ mass fraction | Azodicarbonamide | 1.9 | Azodicarbonamide | 1.9 | Azodicarbonamide | 1.9 | Azodicarbonamide | 1.9 |
| Content of conjugated diene unsaturated double bond (%) | 15.85 | | 30.7 | | 15.85 | | 15.85 | |
| Hardness (Asker C) | 51 | | 49 | | 52 | | 50 | |
| Expansion ratio | 1.5 | | 1.52 | | 1.53 | | 1.5 | |
| Specific gravity (g/cc) | 0.23 | | 0.23 | | 0.24 | | 0.24 | |
| Tensile strength at break (Tb, kg/cm$^2$) | 46 | | 48 | | 51 | | 47 | |
| Elongation at break (Eb, %) | 527 | | 533 | | 506 | | 479 | |
| Tear strength (kg/cm) | 18 | | 17 | | 19 | | 18 | |
| Rebound resilience (%) | 61 | | 61 | | 62 | | 60 | |
| Split tear strength (kg/cm) | 3.6 | | 3.5 | | 3.7 | | 3.7 | |
| Compression set (%) | 53 | | 50 | | 46 | | 51 | |

Note:
Expansion ratio is the size ratio of the foamed test piece to the original mold, and therefore no unit.

TABLE III

| | Comparative Example 1 | | Comparative Example 2 | | Comparative Example 3 | | Comparative Example 4 | |
|---|---|---|---|---|---|---|---|---|
| Component (A)/ mass fraction | TAFMER DF810 | 80 | TAFMER DF810 | 80 | TAFMER DF810 | 80 | TAFMER DF810 | 80 |
| Component (B)/ mass fraction | Taipol DP-6014 | 20 | Taipol DP-6245 | 20 | — | | — | |
| Component (C)/ mass fraction | — | | — | | Taipol 3206 | 20 | Vector SIS 4111 | 20 |
| Component (D)/ mass fraction | dicumyl peroxide | 0.6 | dicumyl peroxide | 0.6 | dicumyl peroxide | 0.6 | dicumyl peroxide | 0.6 |
| Component (E)/ mass fraction | Azodicarbonamide | 1.9 | Azodicarbonamide | 1.9 | Azodicarbonamide | 1.9 | Azodicarbonamide | 1.9 |
| Content of conjugated diene unsaturated double bond (%) | 1 | | 1 | | 0 | | 0 | |

TABLE III-continued

|  | Comparative Example 1 | Comparative Example 2 | Comparative Example 3 | Comparative Example 4 |
|---|---|---|---|---|
| Hardness (Asker C) | 45 | 45 | 56 | 51 |
| Expansion ratio | 1.54 | 1.53 | 1.46 | 1.49 |
| Specific gravity (g/cc) | 0.22 | 0.22 | 0.25 | 0.24 |
| Tensile strength at break (Tb, kg/cm$^2$) | 37 | 33 | 40 | 37 |
| Elongation at break (Eb, %) | 478 | 488 | 370 | 487 |
| Tear strength (kg/cm) | 15 | 14 | 19 | 17 |
| Rebound resilience (%) | 63 | 60 | 59 | 60 |
| Split tear strength (kg/cm) | 3* | 3.1* | 2.6* | 2.8* |
| Compression set (%) | 59* | 60* | 40 | 41 |

Note:
Expansion ratio is the size ratio of the foamed test piece to the original mold, an therefore no unit.

The invention claimed is:

1. A thermoplastic elastomer composition for crosslinked foam, comprising:
   (A) an ethylene-based copolymer;
   (B) a first copolymer;
   (C) a second copolymer, wherein the components (B) and (C) are copolymers comprising a vinyl aromatic monomer and a conjugated diene monomer, the first copolymer having a conjugated diene hydrogenation rate of at least 80% and the second copolymer having a conjugated diene hydrogenation rate of no more than 10%, wherein the second copolymer is not a random copolymer, and the first copolymer and the second copolymer have a sum of a content of conjugated diene unsaturated double bonds ranging from 12% to 50% calculated using below formula:

(mass fraction of component (B))/(mass fraction of component (B)+mass fraction of component (C))×(100%−conjugated diene hydrogenation rate of component (B))+(mass fraction of component (C))/(mass fraction of component (B)+mass fraction of component (C))×(100%−conjugated diene hydrogenation rate of component (C));

(D) an organic peroxide; and
   (E) a foaming agent,
   wherein a mass ratio (A/(B+C)) of the component (A) to a combination of the component (B) and the component (C) is 95/5 to 5/95, and a mass ratio (B/C) of the component (B) to the component (C) is 9/1 to 1/9.

2. The composition of claim 1, wherein the vinyl aromatic monomer is independently selected from the group consisting of styrene, 4-tert-butylstyrene, α-methylstyrene, o-methylstyrene, p-methylstyrene, divinylbenzene, 1,1-diphenylethylene, vinylnaphthalene, N,N-dimethyl-p-aminoethylstyrene, N,N-diethyl-p-aminoethylstyrene, and any combination thereof; the conjugated diene monomer is independently selected from the group consisting of 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, and any combination thereof.

3. The composition of claim 1, wherein the first copolymer has the conjugated diene hydrogenation rate of at least 90%.

4. The composition of claim 1, wherein the second copolymer has a conjugated diene hydrogenation rate of no more than 5%.

5. The composition of claim 1, wherein the mass ratio (B/C) of the component (B) to the component (C) is from 9/1 to 5/5, or the mass ratio (B/C) of the component (B) to the component (C) is from 9/1 to 7/3.

6. The composition of claim 1, wherein the first copolymer has a vinyl aromatic monomer content of 10 wt % to 50 wt %; and the second copolymer has a vinyl aromatic monomer content of 10 wt % to 50 wt %.

7. The composition of claim 1, wherein the first copolymer has a 1,2-vinyl bond content of 30 wt % to 80 wt %; and the second copolymer has a 1,2-vinyl bond content of 5 wt % to 80 wt %.

8. The composition of claim 1, wherein the first copolymer has a peak molecular weight (Mp) of 50,000 to 300,000; and the second copolymer has a peak molecular weight (Mp) of 50,000 to 300,000.

9. The composition of claim 1, wherein the component (A) is an ethylene-α-olefin copolymer.

10. The composition of claim 1, wherein a tan δ peak temperature of the first copolymer as determined by dynamic viscoelasticity measurement (measured at 1 Hz) is in the range of −65° C. to −35° C.

11. The composition of claim 1, wherein a tan δ peak temperature of the second copolymer as determined by dynamic viscoelasticity measurement (measured at 1 Hz) is in the range of −80° C. to −40° C.

12. A method for producing a crosslinked foam, comprising:
   step (a) providing the thermoplastic elastomer composition for crosslinked foam of claim 1; and step (b) crosslinking and foaming the thermoplastic elastomer composition for crosslinked foam.

13. A crosslinked foam produced by crosslinking and foaming the thermoplastic elastomer composition for crosslinked foam of claim 1.

14. The crosslinked foam of claim 13, wherein the crosslinked foam has a hardness of 45 C to 60 C, a specific gravity of 0.2 to 0.3, and a split tear strength of at least 3.3 kg/cm.

15. The crosslinked foam of claim 14, wherein the crosslinked foam has an expansion ratio of 1.4 to 1.6, a rebound resilience of 55% to 70%, and a compression set of no greater than 55%.

16. The crosslinked foam of claim 15, wherein the crosslinked foam has a tensile strength at break of 30 kg/cm$^2$ to 60 kg/cm$^2$, an elongation at break of at least 450%, and a tear strength of at least 10 kg/cm.

* * * * *